United States Patent [19]

Leach et al.

[11] 4,197,333

[45] Apr. 8, 1980

[54] METHOD OF APPLYING PROTECTIVE COATING ON LAMP ENVELOPE

[75] Inventors: Burleigh H. Leach, Hamilton, Mass.; John E. Tozier; Charles C. Casale, both of Williamsport, Pa.

[73] Assignee: GTE Sylvania Incorporated, Stamford, Conn.

[21] Appl. No.: 31,711

[22] Filed: Apr. 20, 1979

Related U.S. Application Data

[63] Continuation-in-part of Ser. No. 896,273, Apr. 14, 1978, abandoned.

[51] Int. Cl.² .............................................. B05D 3/06
[52] U.S. Cl. .................................... 427/54.1; 427/44; 427/55; 427/106; 427/425
[58] Field of Search .................... 427/44, 54, 106, 425, 427/55, 54.1

[56] References Cited

U.S. PATENT DOCUMENTS

| | | | |
|---|---|---|---|
| 2,572,515 | 10/1951 | Poole et al. | 427/425 |
| 2,574,686 | 11/1951 | Brown | 427/425 |
| 3,009,209 | 11/1961 | Weinbrenner et al. | 427/425 |
| 3,258,521 | 6/1966 | Francel | 427/106 |
| 3,953,626 | 4/1976 | Suzuki et al. | 427/425 |
| 4,076,489 | 2/1978 | Schroeter et al. | 427/54 |
| 4,082,870 | 4/1978 | Yenni | 427/425 |

Primary Examiner—John H. Newsome
Attorney, Agent, or Firm—Edward J. Coleman

[57] ABSTRACT

A method of applying a protective light-transmitting coating on the exterior surface of the glass envelope of a lamp, the method comprising: holding the lamp with its longitudinal axis disposed horizontally and rotating the lamp about its longitudinal axis; flow-dispensing a liquid coating material of a predetermined viscosity onto the rotating lamp envelope from a dispensing means including a profiled row of needles located above the lamp; and allowing the envelope coating to be cure-hardened, such as by irradiation. The method is particularly useful for applying an optically clear photopolymer coating on the glass envelope of a photoflash lamp in less than one second and then curing the coating by irradiation with a source of ultraviolet light.

16 Claims, 4 Drawing Figures

METHOD OF APPLYING PROTECTIVE COATING ON LAMP ENVELOPE

CROSS-REFERENCE TO RELATED APPLICATIONS

This is a continuation-in-part of application Ser. No. 896,273, filed Apr. 14, 1978 now abandoned.

Ser. No. 753,255, filed Dec. 22, 1976; Judith A. Dow et al, "Lamp with Protective Coating and Method of Applying Same", assigned the same as this invention.

Ser. No. 699,139, filed June 23, 1976, Judith A. Dow et al, "Lamp with Protective Coating and Method of Applying Same", assigned the same as this invention.

BACKGROUND OF THE INVENTION

This invention relates to lamps with a protective envelope coating and, more particularly, to an improved method for applying such a coating on the glass envelope of a lamp. The method of the invention is particularly useful for applying a UV curable photopolymer as a protective coating on the exterior surface of a photoflash lamp.

A typical photoflash lamp comprises an hermetically sealed glass envelope, a quantity of combustible material located in the envelope, such as shredded zirconium or hafnium foil, and a combustion supporting gas, such as oxygen, at a pressure well above one atmosphere. The lamp also includes an electrically or percussively activated primer for igniting the combustible material to flash the lamp. During lamp flashing, the glass envelope is subject to severe thermal shock due to hot globules of metal oxide impinging on the walls of the lamp. As a result cracks and crazes occur in the glass and, at higher internal pressures, containment becomes impossible. In order to reinforce the glass envelope and improve its containment capability, it has been common practice to apply a protective lacquer coating on the lamp envelope by means of a dip process. To build up the desired coating thickness, the glass envelope is generally dipped a number of times into resin, typically cellulose acetate. After each dip, the lamp is dried to evaporate the solvent and leave the desired coating of cellulose acetate, or whatever other plastic resin is employed.

In the typical solvent dipping process for applying protective coatings, a large number of photoflash lamps are loaded on a rack and then successively dipped in a solvent solution and oven dried three or four times to build up the desired coating thickness. Such a process is time consuming, uses a large area of production floor space, and involves considerable hand labor, all of which adds significantly to manufacturing costs. Further, as the lacquer solution includes a highly flamable solvent, such as acetone, an inadvertent flashing of one of the lamps in either the dip bath or drying oven can ignite the solvent fumes. To substantially reduce or eliminate this hazard, costly automatic extinguishing equipment must be employed. In the event of a solvent ignition, the resulting down time and consumption of fire extinguishing chemicals also adds to the manufacturing costs.

Another approach to providing a more economical and improved containing vessel is described in U.S. Pat. No. 3,893,797, wherein a thermoplastic coating, such as polycarbonate, is vacuum formed onto the exterior surface of the glass envelope. The method of applying the coating comprises: placing the glass envelope within a preformed sleeve of the thermoplastic material; drawing a vacuum in the space between the thermoplastic sleeve and the glass envelope; and simultaneously heating the assembly incrementally along its length, whereby the temperature and vacuum cause the thermoplastic to be incrementally formed onto the glass envelope with the interface substantially free of voids, inclusions and the like. Although this method provides an optically clear protective coating by means of a significantly faster and safer manufacturing process which may be easily integrated on automated production machinery, it does present the disadvantage of requiring preformed plastic sleeves which must be individually designed for each different lamp type, made or purchased, stocked, and fed into the production apparatus which applies the sleeves onto the envelopes.

Further approaches toward providing improved protective coatings for lamps are described in the aforementioned Dow et al patent applications, which relate to coatings including UV curable photopolymers. For example, in the Dow et al application Ser. No. 753,255, a method of coating a flashlamp with a photopolymer is described comprising the following steps. First, the lamp is held vertically with the base up and dipped into a vat of the photopolymer at 60° C. and extracted very slowly, the dip process taking about 45 seconds. The resulting coating thickness is about 0.020 inch. According to an alternative method described in the same Dow et al application, the flashlamp, while revolving, is sprayed with the liquid photopolymer and then transferred directly into the ultraviolet lamp chamber. Dow et al application Ser. No. 699,139 is somewhat similar except that either long or short strands of fiber glass are employed to reinforce the photopolymer coating.

An immersion process for applying a UV cured coating on a photoflash lamp is also described in a published Japanese patent application identified as Public Disclosure Number 52-7720 and having a publication date of Jan. 21, 1977; the corresponding U.S. application Ser. No. 592,194, filed June 17, 1976, was abandoned, and a continuation of a continuation-in-part thereof issued as U.S. Pat. No. 4,076,489 on Feb. 28, 1978.

A somewhat critical aspect of the aformentioned UV cured coatings is that the shape and uniformity of thickness depends on the flow characteristics of the photopolymer resin as influenced by the force of gravity, orientation of the lamp after coating, and viscosity of the resin. Changes in resin viscosity resulting from changes in temperature affect both the repeatability of the shape of the coating and the uniformity of thickness. These irregularities are retained once the coating is hardened. In the case of UV cured coatings used to protect flashlamps from rupture at the time of flashing, thin coating regions resulting from improper resin distribution can result in containment failures. The comparative integrity or containment for various types of vessel constructions can be evaluated by the use of special test lamps, such as described in U.S. Pat. No. 3,955,912 assigned to the present assignee, which controllably induce bursting of the lamp upon ignition. Accordingly, such test lamps were coated with UV cured photopolymers by means of various immersion techniques and compared in flash tests with similar test lamps coated in accordance with the present invention. The results showed that the repeatable uniformity of the coating applied in accordance with the invention provided significantly superior containment characteristics over the lamps coated with the prior art immersion techniques.

SUMMARY OF THE INVENTION

Accordingly, it is an object of this invention to provide an improved method for applying a protective coating on a lamp envelope.

A principal object of the invention is to provide an improved method for rapidly applying an ultraviolet-curable coating on a photoflash lamp which minimizes coating irregularities produced by gravity-induced flow or reflow of the coating.

These and other objects, advantages and features are attained in accordance with the invention by a method comprising: holding the lamp with its longitudinal axis disposed horizontally and rotating the lamp about its longitudinal axis; flow-dispensing a liquid photopolymer coating material having a viscosity during application in the range of 3000 to 5000 centipoise onto the envelope of the rotating lamp from dispensing means located above the lamp; and allowing the coating on the lamp envelope to be cure-hardened. Preferably, the rotating lamp is held in a fixed position below a fixed dispensing means having a plurality of needles through which the liquid coating material is dispensed. The needles are arranged along the length of the lamp and spaced a substantially fixed distance above a surface profile of the lamp envelope. The method is particularly useful for applying photopolymer coatings on lamps which are subsequently cure-hardened by irradiation with a source of ultraviolet light.

Rotation of the horizontally disposed lamp while coating material is dispensed from a plurality of selectively disposed needles located above the lamp exhibits surprising effectiveness in stabilizing the coating shape, once applied, for periods of up to thirty seconds prior to exposure for cure-hardening. This method is particularly effective for overcoming the viscosity characteristics encountered when using coating materials of UV curable photopolymers. Further, the complete coating can be applied in from one to four revolutions of the lamp, which is about 0.6 second or less. Uniform, repeatable coatings can be applied at production line speeds, and when applied to photoflash lamps, the resulting protectively coated vessel exhibits a superior containment capability, along with excellent photometric characteristics. In addition to the above-mentioned improvements in the resulting product, the method of applying lamp coatings according to the invention provides several advantages to the lamp manufacturing process. For example, the process can be solvent free; it requires a minimum of floor space; and it can be readily adapted to automated lamp production apparatus. Further, cure time is reduced to periods of less than a minute. A hard cure is effected immediately, without the need for warehousing to assure a complete cure.

BRIEF DESCRIPTION OF THE DRAWINGS

This invention will be more fully described hereinafter in conjunction with the accompanying drawings, in which.

DESCRIPTION OF PREFERRED EMBODIMENT

The teachings of the present invention are suitable for the application of several different types of liquid protective coating materials to the exterior envelope surface of a wide variety of lamps of different sizes and shapes; however, the invention is particularly advantageous as a method for applying a UV-cured photopolymer coating on photoflash lamps having tubular shaped envelopes with a volume of less than one cubic centimeter. This advantage rests in the significantly improved coating uniformity which is obtained, which in turn results in the superior containment capability exhibited by a small photoflash lamp coated in accordance with the invention. For purposes of example, the invention will be described as applied to the electrically ignitable, filament-type photoflash lamp illustrated in FIG. 1; however, it will be understood that the same principles are applicable to high voltage or percussively ignited flashlamps.

Figure 1:
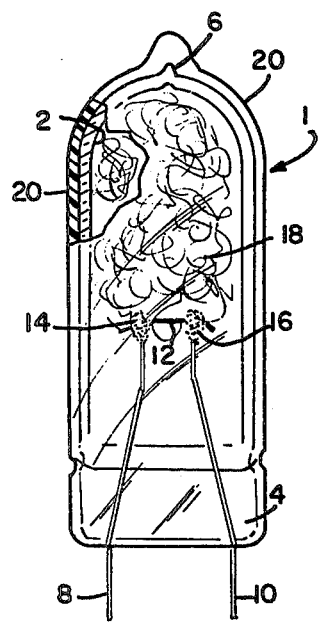
FIG. 1 is an enlarged elevational view, partly in section, of an electrically ignitable photoflash lamp having a protective coating applied in accordance with the invention.

Referring to FIG. 1, one embodiment of the coated lamp 1 is illustrated comprising an hermetically sealed lamp envelope 2 of glass tubing having a press 4 defining a base end thereof and an exhaust tip 6 defining the other end thereof. Supported by the press 4 is an ignition means comprising a pair of lead-in wires 8 and 10 extending through and sealed into the press base. A filament 12 spans the inner ends of the lead-in wires, and beads of primer 14 and 16 are typically located on the inner ends of the lead-in wires 8 and 10, respectively, at their junction with the filament. Typically, the lamp envelope 2 has an internal diameter of less than one-half inch, and an internal volume of less than one cubic centimeter. A combustion-supporting gas, such as oxygen, and a filamentary combustible material 18, such as shredded zirconium or hafnium foil, is disposed within the lamp envelope. Typically, the combustion-supporting gas fill is at a pressure exceeding one atmosphere, with the more recent subminiature lamp types having oxygen fill pressures of up to several atmospheres. As will be described in more detail hereinafter, the exterior surface of the glass envelope 2 is covered with a protective coating comprising a photopolymer 20.

A percussive type photoflash lamp is described in several prior patents of the present assignee; for example, U.S. Pat. No. 3,674,411. As described therein, the percussive lamp also includes a sealed glass envelope containing a filamentary combustible material and a combustion-supporting gas; however, the ignition means comprises a metal primer tube sealed in and extending from one end of the glass envelope and containing a coaxially disposed wire anvil partially coated with a charge of fulminating material.

The high voltage type photoflash lamp is described in a number of patents of the present assignee; for example, U.S. Pat. Nos. 4,059,388 and 4,059,389. As described therein, each of the lamps includes a sealed glass envelope containing a filamentary combustible material and a combustion-supporting gas; however, in the first-mentioned patent, the ignition means comprises a mass of primer material bridging a pair of lead-in wires, one of which is enclosed in an insulating sleeve. In the second mentioned patent, the ignition means includes a pair of spaced apart lead-in wires with spherically shaped terminations; a glass frit is closed over the lead-in wires, and primer material is coated over the frit-coated terminations.

Although somewhat different in structure and operation, the filament, high-voltage, and percussive lamps are similar and that in each the ignition means is attached to one end of the lamp envelope and disposed in operative relationship with respect to the filamentary combustible material. More specifically, the ignition filament 12 of the flashlamp of FIG. 1 is incandesced electrically by current passing through the metal filament support leads 8 and 10, whereupon the incandescent filament ignites the beads of primer 14 and 16 which in turn ignite the combustible 18 disposed within the lamp envelope to provide the actinic light output. Operation of the percussive-type lamp is initiated by an impact onto the primer tube to cause deflagration of the fulminating material up through the tube to ignite the combustible material disposed within the lamp envelope. Operation of the high-voltage type lamp is initiated when a high-voltage pulse from, e.g., a piezoelectric crystal, is applied across the two lead-in wires; electrical breakdown of the primer causes its deflagration which, in turn, ignites the shredded metallic combustible.

As described in the aforementioned copending application Ser. No. 753,255, Dow et al, a number of advantages are obtained by using a photopolymer as protective coating 20. The term "photopolymer" is understood to mean a radiation curable polymer. Rapid curing of such a polymer results from any stimulus that generates free radicals. For example, free radical initiation can be effectively provided by a source of ultraviolet (UV) light or electron beams.

Ultraviolet light in the 185 to 400 nanometer wavelength range is required for UV cures. UV light from commercial mercury vapor, mercury-metal halide, or pulsed xenon lamps is effective in the required wavelength range.

Curing time with UV light can range from fractions of a second to a minute or two depending upon the film thickness, polymer structure, UV light intensity, and initiator type and concentration. Further, the curing can be effected in air, under a vacuum, or in an inert gas atmosphere, such as nitrogen.

The photopolymer basically comprises prepolymers used alone or diluted with reactive monomers. To render the material UV curable, however, one must use a photosensitizer or photoinitiator (such as a benzoin ether) which will directly or indirectly give free radicals when exposed to UV radiation, even at room temperature.

Examples of prepolymers include polyesters, epoxy acrylates, acrylics, polyurethanes, thiolenes, alkenes, or any of a number of general groups. Examples of reactive monomers include styrenes, acrylic, and methacrylic esters, and polyfunctional monomers, such as ethylene glycol diacrylate, trimethylol propane triacrylate, and pentaerythritol tetraacrylate. The monomers also serve as viscosity reducing agents and, as such, they are solvents which dissolve or are miscible with the prepolymer. Accordingly, the reactive monomers reduce the viscosity of the blend to workable levels and/or impart desirable properties to the cured film.

Specific photopolymers we have found to be useful in coating photoflash lamps are thiolene based materials available from W. R. Grace & Company, Maryland and identified as RCC Blend 15 XRCP-7211. Approximately 99 percent by weight of these thiolene based photopolymers comprise a blend of prepolymers, such as di- or polythiopolymers and di- or polyene-polymers; the balance of the mixture comprises a photoinitiator, such as benzoin ether or aromatic ketone, e.g., benzophene, and stabilizers, which are small quantities of free radical scavengers.

The flow and viscosity characteristics of the liquid photopolymer can be adjusted by adding fumed silica to increase the thixotropicity of the mixture. The increased viscosity enables application of a heavier coating and reduces gravity induced runback of the wet coating prior to cure. The viscosity can be decreased by heating, or adding monomers as discussed above.

The photopolymer compositions referred to above result in an essentially solvent free process and solvent-free coating. It is to be understood, however, that the method to be described hereinafter is equally suitable for use with solvent-containing photopolymers.

An example of a liquid photopolymer that we have found to be particularly useful for coating photoflash lamps in accordance with the present invention is an acrylo-urethane resin, available from the Hughson Chemical Company as Type No. 3075-20 or 3254-11, with a viscosity near 7,800 centipoise at 25° C.

In accordance with the present invention, we have discovered a significantly improved method for providing an optically clear protective coating on the exterior surface of the glass envelope of the lamp which minimizes the coating irregularities produced by gravity-induced flow or re-flow of the coating. As a result, the coating provides a superior containment vessel. The method provides a significantly faster, safer and more economical manufacturing process, and it may easily be integrated into automated production machinery.

According to the invention, the UV-curable photopolymer material is dispensed from above unto a horizontal, rotating lamp. Preferably, the liquid coating material is dispensed by means of a mechanically activated syringe which keeps the volume flow rate constant, and thus, which is independent of the viscosity of the material. Horizontal rotation of the specimen stabilizes the coating shape, once applied, for periods of up to thirty seconds prior to exposure to ultraviolet light for curing. We have found that in this manner uniform, repeatable coatings can be applied at production line speeds.

Figure 2:
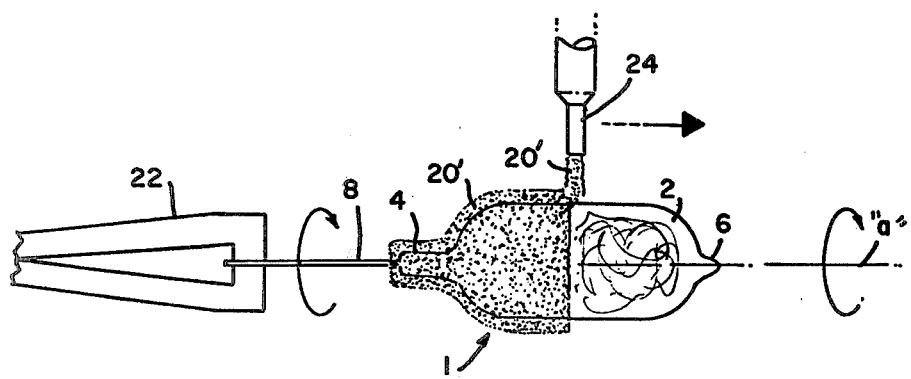
FIG. 2 illustrates a first method of applying a liquid coating material in accordance with the invention.

One method of applying the coating in accordance with a rudimentary embodiment of the invention is illustrated in FIG. 2. The lamp 1 having a glass envelope 2 is held in a horizontal position. More specifically, consider the longitudinal axis "a" passing through the base of the lamp, formed by press 4, and the end of the lamp opposite that base, in this instance the exhaust tip 6. The lamp 1 is held with its longitudinal axis "a" disposed horizontally by means of a pincer-type holding head 22 which clamps the exterior portions of the metallic lead-in wires 8 and 10. The head 22 may comprise a portion of a lathe-type mechanism which rotates the lamp about its longitudinal axis "a". While the horizontally disposed lamp envelope 2 is rotated in this manner, a needle-type dispensing means 24, located above the lamp dispenses a liquid coating material 20' unto the glass envelope 2 of the rotating lamp. In this embodiment there is a relative linear motion provided between the lamp and the dispensing means to cause the coating material to cover the rotating lamp envelope from one end to the other. More particularly, in FIG. 2, the rotating lamp 1 is shown in a fixed position while the dispensing means 24 above the lamp is moved in a linear path from left to right, as illustrated by the arrow. Alternatively, the dispensing means may be held in a fixed position and the rotating lamp may be moved in a linear path with respect thereto. On the other hand, both the lamp and the dispensing means may be moved in parallel but opposite directions, or in the same direction in parallel at different speeds.

In a specific application of the method illustrated in FIG. 2, the above-mentioned photopolymer (Hughson Chemical Company Type 3075-20, an acrylo-urathane resin with a viscosity near 7,800 centipoise at 25° C.) was metered by means of a mechanically activated syringe through a surgical needle 24 having a 16-gauge size and a length of 1.25 inch. The dispensing end of the needle was spaced 0.2 inches from the surface of the lamp being coated. The volume flow rate was adjusted to provide approximately 0.05 cubic centimeters of resin per second. The motion of the needle 24 along the length of the lamp was 0.0448 inch per lamp rotation. The lamp rotation rate was 158 rpm, and flow was terminated near the tip of the lamp. After the conclusion of dispensing step, the lamp was allowed to remain rotating for a predetermined delay period, ranging from 7 seconds to 12 seconds, prior to the step of curing the coating by ultraviolet irradiation.

Figure 3:
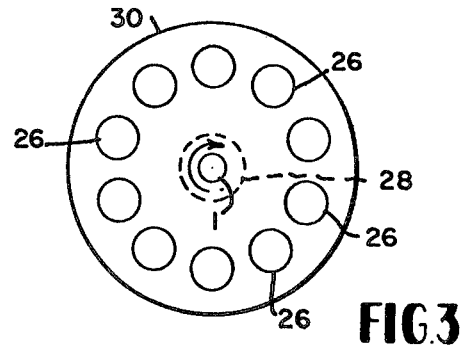
FIG. 3 is a cross-section schematically illustrating one method of cure-hardening the lamp coating by irradiation in accordance with the invention.

Following the above described coating and delay steps; the rotating, horizontal lamp 1 was exposed to UV radiation having a peak wavelength near 313 nanometers generated by ten fluorescent lamps 26 (GTE Sylvania Incorporated Type F6T5, having an internal coating of No. 2021 phosphor) arranged in a cylindrical fashion, as schematically illustrated in the cross-section of FIG. 3. Curing of the resin took place in nitrogen at a distance of 2 inches from the sources 26 in forty seconds. For example, in FIG. 3, the circular dashed-line 28 represents the position of the quartz tubing that may be used to provide the nitrogen purged container within which the lamp 1 is held. The solid circular line 30 at the outer periphery represents the cylindrical internal reflective housing containing the UV sources. The cured coating produced by this method measured 0.023 inch in thickness.

Subsequent to the curing step and post-cure cooling, a lubricant may be applied, such as by spraying, over the coating 20. This also functions as an antistatic agent. Suitable lubricant materials include Dow Corning type DC 230, which is a silicone in textile spirits, and Dupont products such as the aqueous Dupanol (a sodium lauryl sulfate), Merpol (a long chain alcohol-ethylene oxide condensate), and Zelec (an alcohol phosphate).

Coatings produced according to the invention are more uniform in thickness than that provided by the previously described prior art techniques. This in turn provides reliable coating performance with regard to preventing rupture at the time of flashing. For example, this is particularly illustrated by Table 1, below which illustrates the comparative containment capabilities of lamp coatings applied by different techniques, along with a comparative indication of the coating irregularity. The lamps employed in obtaining the flash testing data of Table 1 were of the type described in U.S. Pat. No. 3,995,912, which are particularly designed to controllably induce bursting of the lamp upon ignition. In the first test (Test-1), the test lamp specimens, once dipped according to the indicated prior art technique, were immediately exposed to UV radiation while the tip remained down. The cured coatings were irregular and thin in the press area 4. The thin area failed to provide adequate protection from rupture at the time of flashing. Test lamps similarly dipped, but remaining tip down for periods exceeding 2 to 3 seconds before curing tip down, produced even more irregular coatings, resulting in higher coating failures.

In a second test (Test-2), test lamps were similarly coated but were inverted immediately after dipping, permitting the resin to redistribute (reflow) over the lamp prior to curing. The amount of time allowed for reflow affected the uniformity of the coating thickness as well. The longer the reflow time the more non-uniform the coating.

The third test (Test-3) illustrates the results achieved with test lamps coated in accordance with the present invention. The significant improvement in containment and the uniformity of coating thickness is evident.

TABLE 1

| Test | Description | No. of Lamps | Coating Failures Causing Rupture | Difference in Coating Thickness Lamp End-to-End |
|---|---|---|---|---|
| Test-1 | Immersion coat, tip-down cure | 10 | 80% | 33% |
| Test-2 | Immersion coat, tip-up cure - preceded by 2 sec. reflow | 52 | 23% | 13% |
| Test-3 | Horizontal rotating coat followed by delay of up to 12 seconds prior to U.V. cure | 48 | 15% | <3% |

The following Table 2 relates to flash testing with regular production lamps. In Test-4, the regular lamps were coated according to the invention and exposed to UV radiation within a 12 second delay period after conclusion of the step during which the coating was dispensed. Test-5 provides a control group and relates to uncoated lamps of the same type.

TABLE 2

| Test | Description | No. of Lamps | Coating Failures Causing Rupture | Difference in Coating Thickness Lamp End-to-End |
|---|---|---|---|---|
| Test-4 | Less than 12-sec. stabilize before exposure | 29 | 0% | 2% |
| Test-5 | Uncoated lamps of same type | 10 | 100% | Not Applicable |

The foregoing tables therefore clearly illustrate the effectiveness of the coating method of the invention in preventing rupture at the time of flashing. Further, as evident from Table 2, the preferred delay times between the conclusion of resin dispensing and the beginning of UV curing are less than 12 seconds.

Figure 4:
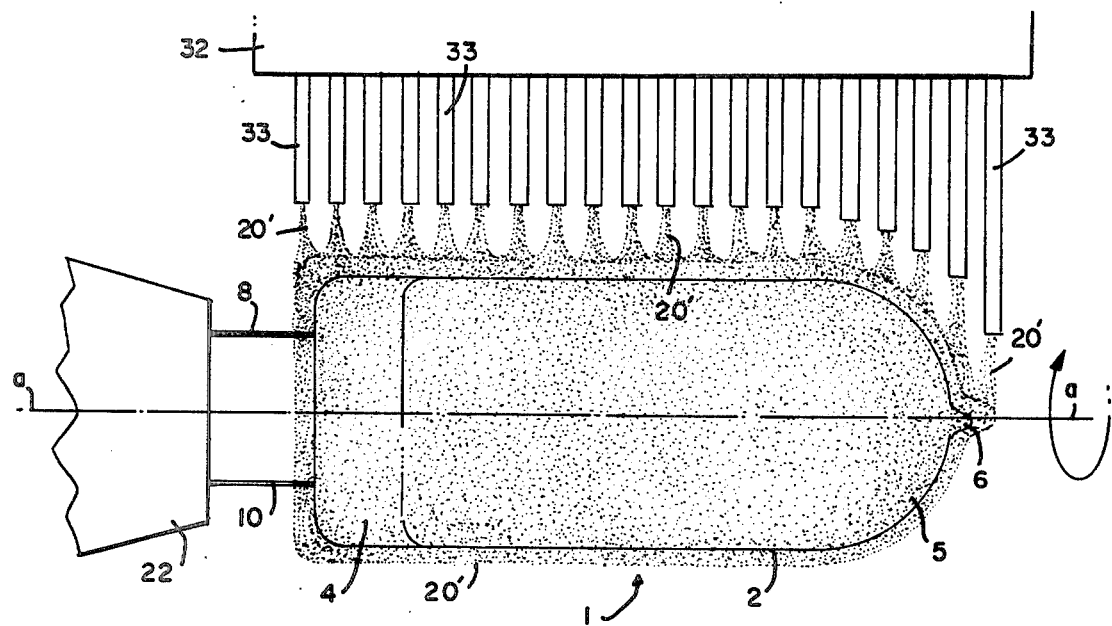
FIG. 4 illustrates a second and preferred method of applying the liquid coating material in accordance with the invention.

Referring now to FIG. 4, a preferred embodiment for dispensing the liquid coating material 20' is illustrated which reliably and consistently provides a smooth, uniform coating in minimal time. In this instance, there is no relative linear motion between the dispensing means and the rotating lamp. More specifically, as illustrated, the overhead dispensing means 32 is fixed and provided with a plurality of needles 33, through which the liquid coating material 20' is dispensed onto the exterior surface of lamp 1, which is held in a fixed position while being rotated about its longitudinal axis "a" under the dispensing needles 33.

In order to rapidly apply full coverage with the coating material 20', the needles 33 are arranged along the length of the lamp and spaced a substantially fixed distance above a surface profile of the lamp envelope. Preferably, all of the needles 33 are disposed in a vertical plane passing through the longitudinal axis of the lamp. A valve or syringe in dispenser 32 supplies the liquid photopolymer to all needles at the same time so as to simultaneously maintain a constant flow rate from each respective needle. Preferably, the dispensing means 32 is temperature controlled to maintain the dispensed liquid photopolymer at a predetermined viscosity during application in the range of 3000 to 5000 centipoise. This compensates for variable ambient conditions, and has been found to permit rapid attainment of a smooth uniform coating.

For a flashlamp about one inch long and having a diameter of about 0.260 inch, use of a series of 19 or 20 needles, with their internal bore walls disposed at equally spaced intervals, has provided excellent results. Symmetrical coatings 20 in the range of about 0.010 to 0.025 inch thick in the cylindrical portion of the envelope 2 can be provided in the final product where the spacing between the needles 33 and the rotating surface of the lamp envelope is in the range of about 0.030 to 0.060 inch. Uniformly thick coatings over the dome 5 and tip 6 of the lamp envelope are provided when the profiled configuration of the output end of the series of needles approximately conform to profile of the envelope surface of the dome region 5. At the press seal end 4 of the lamp, the needles conform to the envelope surface having the maximum diameter and, thus, are in line with the needles over the cylindrical portion.

The circumferential surface area is smallest at the tip end 6 of the lamp. Accordingly, coating application in this region may be enhanced by using smaller size needles at the tip than the needles over the cylindrical portions of the envelope. Similarly, uniformly thick coatings over the press area occur when the respective needles thereover are smaller than those over the central portion of the lamp. Furthermore, needle sizes may alternate large-small, proceeding from the central region of the envelope toward either end, to obtain uniformly thick coatings on a given type flashlamp. Hence, we have found that control of coating thickness in given applications can be provided by predetermined selection of given needle sizes. For example, uniformly thick coatings, near 0.025 inch, have been provided with needle sizes of 21-gauge and 20-gauge (thin wall stainless steel surgical tubing) when the viscosity of the coating material is about 3400 centipoise during application. The optimum spacing between the needles and the envelope surface was between about 0.045 and 0.055 inch for providing a uniformly thick coating. The preferred coating material employed was the aforementioned type 3254-11 of Hughson Chemical Company; the above mentioned viscosity was attained by heating the photopolymer to typically 30° C. in the dispenser.

By use of this preferred multiple needle dispenser, as described above, the application of the liquid photopolymer coating 20' onto the lamp can be completed in about 0.6 second or less, with the lamp being rotated from one to four revolutions at a fixed rate during this period of being coated by the dispenser. The rate of lamp rotation, during coating, preferably lies in the range of about 100 to 800 revolutions per minute.

Typically, between the conclusion of the above described dispensing step and the start of the step of curing by UV irradiation, the coated flashlamp is permitted to rotate (while still remaining horizontal) for a predetermined delay period in the range of 2 to 12 seconds to allow the individually deposited bands of liquid photopolymer to flow together for providing a uniformly smooth coating. Again, radiant energy can be used to enhance this rate at which the coating bands of photopolymer flow together.

Variations of the above-described coating application technique have been tested and proved to be effective. For example, it may be quite desirable to provide a rotation of the lamp during the delay step and irradiation (the curing step) which is at a substantially different speed than the rotation of the lamp under the dispensing means. For example, a slower rotation than that used during dispensing has been found to enhance uniformity. Variable or intermittent rotation may be employed during exposure to UV radiation. The steps of the method may be repeated to build up a predetermined final coating thickness. Other types of UV sources may be employed wherein the spectrum and power density are commensurate with the curing requirements of given UV-cure resins, or a combination of UV sources with differing UV emission may be used to provide a similar effect. As already discussed, another particularly desirable feature for providing improved viscosity control is to employ heated or chilled coating dispensers for preconditioning the resin to facilitate dispensing.

Although the invention has been described with respect to specific embodiments, it will be appreciated that modifications and changes may be made by those skilled in the art without departing from the true spirit and scope of the invention. For example, the described coating method is also applicable to spherical or bulb shaped lamps, other than tubular, associated with other lighting applications, such as incandescent, fluorescent, and other types of arc discharge lamps.

What we claim is:

1. A method of applying a protective light-transmitting coating on the exterior surface of a lamp envelope, said lamp having a longitudinal axis passing through a base of the lamp and the end of the lamp opposite said base, said method comprising:

holding said lamp with said longitudinal axis thereof disposed horizontally and rotating said lamp at a fixed rate;

flow-dispensing a liquid photopolymer coating material having a viscosity during application in the range of about 3000 to 5000 centipoise onto the unheated envelope of said rotating lamp while maintaining a condition of no linear motion between said dispensing means and said rotating lamp, said dispensing means having a plurality of needles through which said liquid coating material is dispensed, said needles being arranged along the length of said lamp and spaced a substantially fixed distance above a surface profile of said lamp envelope;

said lamp being rotated from one to four revolutions while being coated by said dispensing means, and application of said coating material onto the lamp envelope being completed in about 0.6 second or less; and allowing the coating on said lamp envelope to be cure-hardened.

2. The method of claim 1 wherein said lamp has an hermetically sealed tubular glass envelope and includes ignition means sealed through the base of said glass envelope and having an exterior metallic portion extending from said envelope, the end of said glass envelope opposite said base defining an exhaust tip, and said lamp is held horizontally and rotated by means clamping said exterior metallic portion of the ignition means.

3. The method of claim 1 wherein the coating on said lamp envelope is cured by UV radiation.

4. The method of claim 1 wherein said dispensing means is fixed, and said lamp is held in a fixed position while being rotated under said dispensing means for said period of about 0.6 second or less.

5. The method of claim 1 wherein said coating material is a liquid photopolymer comprising a UV curable synthetic polymer containing an organic photoinitiator or photosensitizer.

6. The method of claim 5 wherein said dispensing means is temperature controlled to maintain said dispensed liquid photopolymer at a predetermined viscosity in the range of 3000 to 5000 centipoise.

7. The method of claim 5 wherein said dispensing means includes means for supplying said liquid photopolymer under pressure to all of said needles at the same time for simultaneously maintaining a constant flow rate from each respective needle.

8. The method of claim 5 wherein said step of allowing the coating to be cure-hardened comprises rotation of said lamp while irradiating the coated envelope with a source of ultraviolet light for a predetermined period.

9. The method of claim 8 wherein the rotation of said lamp during irradiation is at a substantially different speed than the rotation of said lamp under said dispensing means.

10. The method of claim 8 including the further step of rotating said lamp for a predetermined delay period in the range of 2 to 12 seconds between the conclusion of said dispensing step and the start of said step of curing by ultraviolet irradiation to allow the individually deposited bands of liquid photopolymer to flow together for producing a uniformly smooth coating.

11. The method of claim 10 wherein said delay period step includes the use of radiant energy for enhancing the rate at which said coating bands of photopolymer flow together.

12. The method of claim 1 wherein the needles of said dispensing means are disposed in a vertical plane passing through said longitudinal axis of the lamp.

13. The method of claim 12 wherein said lamp has an hermetically sealed tubular glass envelope and includes ignition means sealed through the base of said glass envelope and having an exterior metallic portion extending from said envelope, the end of said glass envelope opposite said base defining an exhaust tip, and said lamp is held horizontally and rotated by means clamping said exterior metallic portion of the ignition means.

14. The method of claim 13 wherein the spacing between said needles and the surface of said lamp envelope is in the range of about 0.030 to 0.060 inch and the final thickness of said coating is in the range of about 0.010 to 0.025 inch.

15. The method of claim 14 wherein the internal bore walls of said needles are disposed at equally spaced intervals with about 20 needles per inch of envelope length.

16. The method of claim 12 wherein control of coating thickness is provided by predetermined selection of respective needle sizes.

* * * * *